United States Patent [19]
Tamburrino et al.

[11] Patent Number: 5,365,331
[45] Date of Patent: Nov. 15, 1994

[54] SELF CENTERING DEVICE FOR BORESCOPES

[75] Inventors: Richard A. Tamburrino, Auburn; Alan S. Knieriem, Syracuse; Roger Leseberg, Liverpool; Timothy J. Smith, Auburn, all of N.Y.

[73] Assignee: Welch Allyn, Inc., Skaneateles Falls, N.Y.

[21] Appl. No.: 9,779

[22] Filed: Jan. 27, 1993

[51] Int. Cl.$^5$ .............................................. G02B 23/26
[52] U.S. Cl. ...................................... 356/241; 73/866.5
[58] Field of Search ........................ 356/241; 73/866.5

[56]  References Cited
U.S. PATENT DOCUMENTS

| | | |
|---|---|---|
| 2,371,176 | 3/1945 | Kirk et al. |
| 2,587,476 | 2/1952 | Huhn .................... 356/241 |
| 3,517,128 | 6/1970 | Hines ..................... 356/241 |
| 4,418,572 | 12/1983 | Prange . |
| 4,843,896 | 7/1989 | Napeloni et al. ............ 73/866.5 |

*Primary Examiner*—Vincent P. McGraw
*Attorney, Agent, or Firm*—Harris Beach & Wilcox

[57] ABSTRACT

An apparatus for holding an insertion tube of a borescope centered within a passage along which the borescope travels, that includes a pair of opposed collar assemblies slidably mounted upon the insertion tube of the borescope, with each collar assembly including a cylindrical body section and an annular retaining ring, being removably mounted in face-to-face contact with one end face of the body section, and each retaining ring having a rear end face in contact with one body section and a front end face facing that of the retaining ring on the opposing collar assembly, and each retaining ring further including a series of circumferentially spaced rotor seats each having a longitudinally disposed slot passing through the outer wall of the ring, and a plurality of elongated wire spring members with each end fitting in a rotor seat, thus joining the opposing collar assemblies, where one of the collar assemblies is held in a stationary position adjacent to the distal viewing end of the borescope while the other collar assembly may be slid along the borescope insertion tube so that the wire spring members maintain contact with the passage in which the borescope travels.

6 Claims, 1 Drawing Sheet

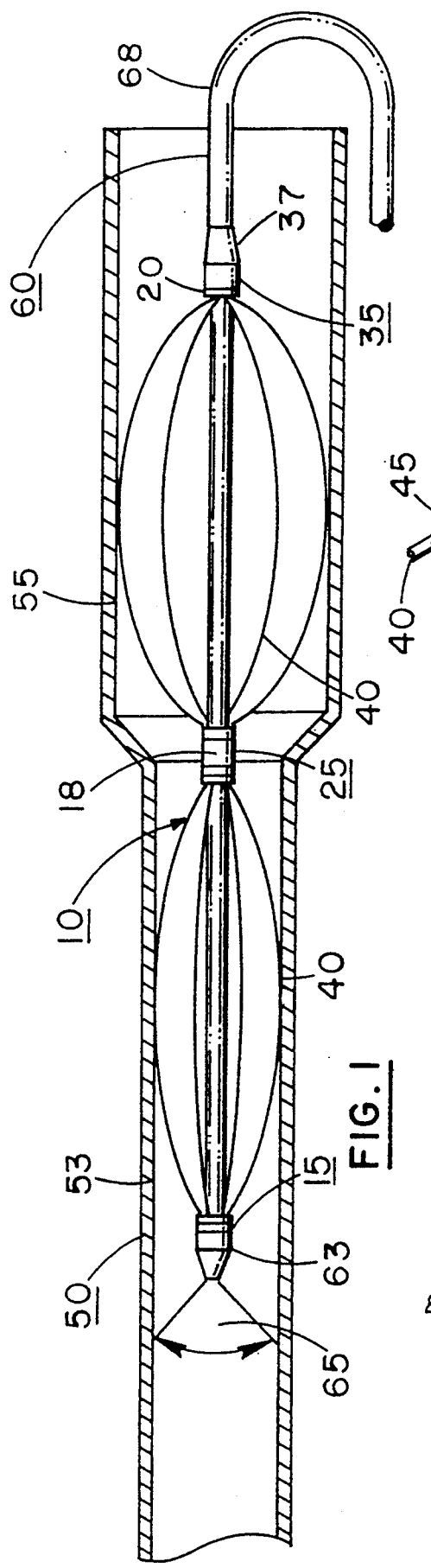
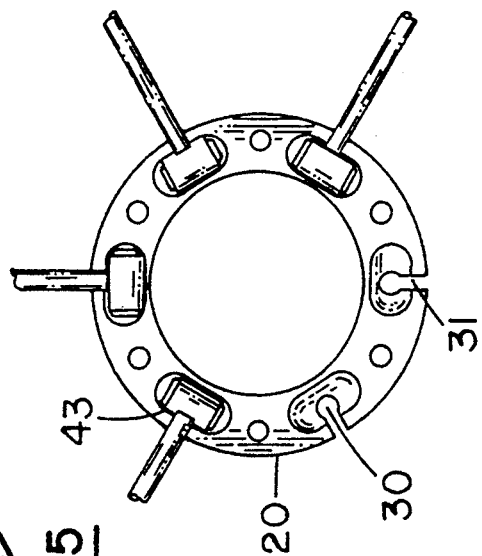
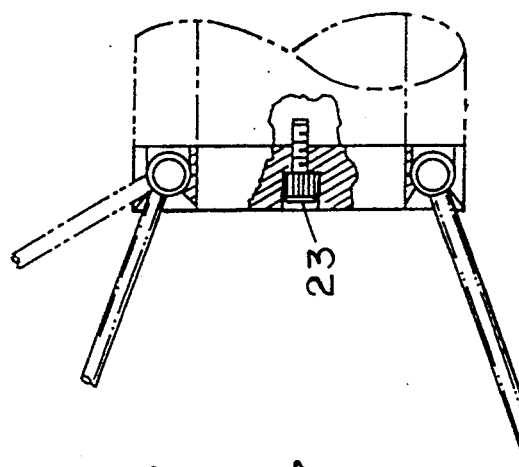
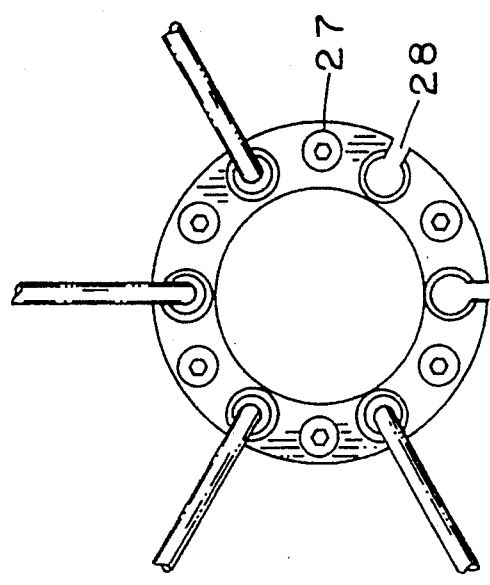

SELF CENTERING DEVICE FOR BORESCOPES

BACKGROUND OF THE INVENTION

This invention relates to a self centering device for maintaining a borescope in a centered position within a passage or conduit. More specifically it relates to an improved self centering device for maintaining a borescope in a centered position within a passage that accommodates itself to a wide range of inner passage diameters.

Borescopes are used for viewing inaccessible areas such as the interior portions of pipes of various kinds, jet engines, conduits in nuclear installations, and the like. Typically, borescopes comprise insertion tubes which are placed through an outlet of the region to be viewed, a light source for illumination, a means of conducting this illumination to the distal end (or head) of the insertion tube, an imaging device and optics for viewing a target positioned in the distal end of the insertion tube, an external video display monitor, and electronic circuitry for performing various necessary functions. When the target is remote from the outlet and, particularly when the route from the outlet to the target is not a linear one, a means of controlling the path taken by the insertion tube is also necessary.

When a borescope is being used for inspection of a long channel whose diameter is considerably wider than that of the borescope insertion tube, it is desirable to maintain the borescope in a centered position within the channel. Doing so serves two purposes. First the borescope head is protected from impact with or abrasion against obstacles in the channel. Second, the imaging function of the borescope is presented with the maximal visual field possible.

In order to allow a borescope to be used with a wide range of inner channel diameters, and also to travel in a channel whose internal diameter may change, as for example, where the channel comprises joined pipes of differing diameters, it is desirable that the borescope insertion tube operate in conjunction with a self centering apparatus. This device, used to center the borescope, must be capable of adjusting to different diameter channels as a route is traversed.

Wire spring elements are well suited for accomplishing this objective. If a portion of the distal section of a borescope is encased in a plurality of curved wire spring elements, a segment of each of these wire spring elements will engage the inner wall of the channel, and thus center the borescope head. Because the wire springs are resilient, they can be compressed to accommodate a smaller diameter passage, or expanded to accommodate a larger diameter passage. And where, as in the instant invention, one end of the self centering device is affixed at or near the borescope head while the rest of the device is allowed to slide along the borescope insertion tube, the distance between the distal and proximate ends of the self centering device can be increased or shortened. If the distance is increased, the spring wire elements will describe a flatter arc and be accommodated to a smaller diameter channel. If the distance is decreased, the spring wire elements will describe a more rounded arc and be accommodated to a larger channel.

In the prior art, as for example in U.S. Pat. No. 4,418,572 to Prange and U.S. Pat. No. 2,587,476 to Huhn, the wire springs were secured at their ends to a collar. Thus, although some deformability was allowed, wide variations in conduit diameter placed severe strains on the spring wires, causing them to break prematurely. This breakage often happened in use, that is in the field, causing additional problems because the spring wires were welded or otherwise permanently affixed to the rest of the self centering device and could not be repaired or replaced in the field. Thus either spare centering devices had to be kept in the field, or else the entire operation had to be halted until the unit could be repaired off site and returned to the work site.

SUMMARY OF THE INVENTION

It is therefore a primary object of the present invention to provide an improved self centering device for a borescope.

It is another object of the present invention to provide a self centering device for a borescope than can be accommodated in a wide range of channel diameters.

It is still another object of the present invention to provide a self centering device for a borescope that can be accommodated in a wide range of channel diameters without placing undue stress on its spring wire components.

It is yet another object of the present invention to provide a self centering device for a borescope whose spring wire components can be easily replaced in the field.

These and other objects of the present invention are attained by an apparatus for holding the insertion tube of a borescope centered within a passage along which the borescope travels that includes: a pair of opposed collar assemblies capable of being slidably mounted upon the insertion tube of a borescope, each collar assembly including a cylindrical body and an annular retaining ring removably mounted in face-to-face contact with one end face of the body section, each retaining ring having a rear end face in contact with a body section and a front end face facing that of the retaining ring on the opposing collar assembly, each retaining ring further including a series of circumferentially spaced rotor seats formed therein and a longitudinally disposed slot passing radially through the outer wall of the ring into each rotor seat, a plurality of elongated wire spring members equal in number to that of the rotor seats on each retaining ring, and extending between the collar assemblies, each end of each wire passing through a longitudinal slot formed in a retaining ring into a rotor seat on opposing collars and being attached to a rotor mounted within said seat, and clamping means for holding one of said collar assemblies in a stationary position upon the insertion tube whereby said clamped assembly is retained adjacent to the distal viewing end of the borescope while the other collar assembly may be slid along the borescope insertion tube so that the wire spring members maintain contact with the passage in which the borescope travels.

BRIEF DESCRIPTION OF THE DRAWINGS

For a better understanding of these and other objects of the present invention, reference is made to the detailed description of the invention which is to be read in conjunction with the following drawings, wherein:

FIG. 1 is a side view of a preferred embodiment of the instant invention in a pipe channel shown in phantom.

FIG. 2 is a top view of the retaining ring of the invention of FIG. 1, showing 4 spring wires retained in the collar assembly.

FIG. 3 is a fragmentary side view of the collar assembly of the instant invention partially cut away to show a retaining screw, and showing a second position of the wire spring in phantom.

FIG. 4 is a top view of the collar without the retaining ring, showing the ends of the spring wires nesting in their receptacles.

FIG. 5 is a fragmentary view of the end of a spring wire.

DETAILED DESCRIPTION OF THE INVENTION

Referring, now to FIG. 1 there is shown the preferred embodiment of a borescope centering device 10 attached to a borescope 60 travelling through a pipe 50. At the distal end of the borescope centering device 10 is the borescope head retainer 63, having a forward facing field of view 65 encompassing the entire inner diameter of the pipe 50 through which the assembly is travelling. The borescope head (not shown) fits within the borescope head retainer 63.

The borescope head retainer 63 is attached via screw threads or other known means to a distal collar assembly 15 of the borescope centering device 10. The distal collar assembly 15 is attached to a plurality of spring wires 40 in a manner to be described below. The spring wires 40 are, in turn attached to an intermediate collar assembly 25, which is attached in turn to additional spring wires 40 which are finally attached to a terminal collar assembly 35. The borescope insertion tube 68 to which the borescope head retainer 63 is attached, passes through the center of each of the collar assemblies and through the center of each grouping of spring wires 40.

In the preferred embodiment it can be seen that while the distal collar assembly 15 is fixed to the borescope 60, the remaining two collar assemblies are slidably mounted along the borescope insertion tube 68. When the terminal collar assembly 35 is slid toward the distal end of the borescope 60, the distance between collar assemblies shortens and the wire springs are bent into more rounded arcs.

FIG. 1 illustrates the device of the instant invention passing through a region of pipe 50 where the radius of the pipe narrows. The borescope centering device 10 accommodates itself to this change in pipe diameter by compressing in the section engaged in a more narrow pipe 53, while remaining expanded in the section of wider pipe 55. While the preferred embodiment shows a distal collar assembly 15, an intermediate collar assembly 25, and a terminal collar assembly 35, it is possible as desired for different applications, to construct a borescope centering device which has only a distal collar assembly 15 and a terminal collar assembly 35, or devices which have more than one intermediate collar assembly.

Each collar assembly of the instant invention comprises three sections. A cylindrical body section 18 is attached via screw threads to at least one retaining ring 20. Intermediate collar assemblies 25 are also attached to a second retaining ring 20 while the distal collar assembly 15 is attached to the borescope head retainer 63 and the terminal collar assembly 35 is attached a terminal body 37.

Between each cylindrical body section 18 and retaining ring 20 is secured a plurality of spring wire ends 43.

FIG. 2–5 show the means by which the spring wire ends are retained between a cylindrical body section 18 and retaining ring 20. Each retaining ring 20 contains, spaced about its circumference, a series of holes. These alternate between screw holes 27 sized for retaining screws 23 and spring holes 28 sized for spring wire necks 45 and spring wire ends 43. When screws 23 are used to attach the retaining ring 20 to the cylindrical body section 18, the cylindrical spring wire ends 43 are retained within receptacles 30 which pivotally accommodate the spring wire ends 43. The spring wire neck 45 passes through a slot 31 in the outer wall of the retaining ring 20. Because the spring wire ends 43 can pivot as the curvature of the spring wires increases or decreases, there is no strain placed on the spring wires as would otherwise be placed upon them, especially in the region of the spring wire necks 45. Should a spring wire 40 break, however, removing all the screws 23 releases the retaining ring 20 from the body section 18, allowing the spring wire 40 to be removed and replaced. Although the spring wire end 43 and receptacle 30 are shown as cylindrical shape, any other shape which allows easy pivoting, such as a sphere, could also be used.

While this invention has been explained with reference to the structure disclosed herein, it is not confined to the details set forth and this application is intended to cover any modifications and changes as may come within the scope of the following claims:

What is claimed is:

1. An apparatus for holding an insertion tube of a borescope centered within a passage along which the borescope travels that includes:

a pair of opposed collar assemblies capable of being slidably mounted upon the insertion tube of a borescope;

each collar assembly including a cylindrical body section and an annular retaining ring, having an outer wall and being removably mounted in face-to-face contact with one end face of the body section;

each retaining ring having a rear end face in contact with one body section and a front end face facing that of the retaining ring on the opposing collar assembly;

each retaining ring further including a series of circumferentially spaced rotor seats formed therein and a longitudinally disposed slot passing radially through the outer wall of the ring into each rotor seat;

a plurality of elongated wire spring members equal in number to that of the rotor seats on each retaining ring, and extending between the collar assemblies, each end of each wire passing through a longitudinal slot formed in a retaining ring into a rotor seat and being attached to a rotor mounted within said seat; and clamping means for holding one of said collar assemblies in a stationary position upon an insertion tube whereby said clamped assembly is retained adjacent to the distal viewing end of the borescope while the other collar assembly may be slid along the borescope insertion tube so that the wire spring members maintain contact with the passage in which the borescope travels.

2. The apparatus of claim 1 wherein each end of each spring wire member may pivot over an angle range of 90° when retained within the rotor seats.

3. The apparatus of claim 1 wherein each spring wire member and rotor to which said spring wire member is attached form a "T" and wherein each rotor is cylindrical in shape.

4. The apparatus of claim 1 wherein the distal viewing end of the borescope is attachable directly to the collar assembly which is clamped to the borescope insertion tube.

5. The apparatus of claim 1 wherein said removable mounting of said retaining ring is accomplished using attaching means wherein said attaching means joins said retaining ring to said body section so that upon removing said retaining ring from said body section at least one of said wire spring members is rendered removable.

6. An apparatus for holding the insertion tube of a borescope centered within a passage along which the borescope travels that includes:
- a pair of opposed end collar assemblies capable of being slidably mounted upon the insertion tube of a borescope;
- each end collar assembly including a cylindrical body section and an annular retaining ring, having an outer wall and being removably mounted in face-to-face contact with one end face of the body section;
- each retaining ring having a rear end face in contact with one body section and a front end face facing that of the retaining ring on an opposing end collar assembly;
- each retaining ring further including a series of circumferentially spaced rotor seats formed therein and a longitudinally disposed slot passing radially through the outer wall of the ring into each rotor seat;
- at least one intermediate collar assembly,
- each intermediate collar assembly including a cylindrical body and two annular retaining rings, each removably mounted in face-to-face contact with one end face of the body section,
- each retaining ring having a rear end face in contact with a body section and a front end face facing that of the retaining ring on an opposing collar assembly,
- each retaining ring further including a series of circumferentially spaced rotor seats formed therein and a longitudinally disposed slot passing radially through the outer wall of the ring into each rotor seat,
- a plurality of elongated wire spring members equal in number to that of the rotor seats on each retaining ring, and extending between two collar assemblies, each end of each wire passing through a longitudinal slot formed in a retaining ring into a rotor seat and being attached to a rotor mounted within said seat; and
- clamping means for holding one of said end collar assemblies in a stationary position upon the insertion tube whereby said clamped assembly is retained adjacent to the distal viewing end of the borescope while the other end collar assembly and each at least one intermediate collar assembly may be slid along the borescope insertion tube so that the wire spring members maintain contact with the passage in which the borescope travels.

* * * * *